July 17, 1962 B. W. O'NEAL ETAL 3,044,173
PLUMBING DEVICE
Filed June 20, 1960
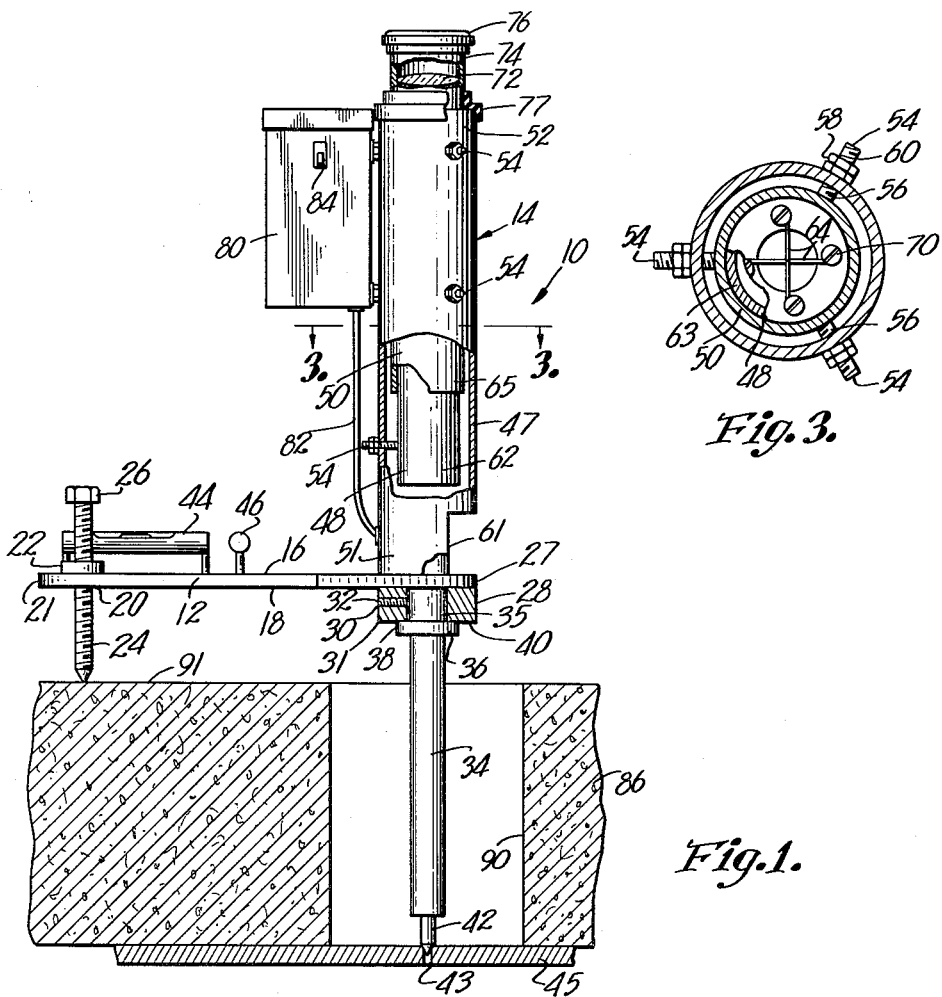
Fig. 3.
Fig. 1.
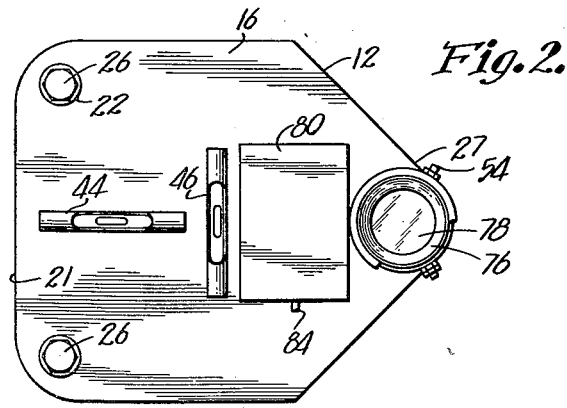
Fig. 2.
Bert W. O'Neal
Dale G. O'Neal
John P. Gorman
INVENTORS.
BY
Hovey, Schmidt, Johnson & Hovey
ATTORNEYS.

United States Patent Office 3,044,173
Patented July 17, 1962

3,044,173
PLUMBING DEVICE
Bert W. O'Neal, 5608 E. 27th St. Terrace; Dale G. O'Neal, 1700 E. 67th St. Terrace North; and John P. Gorman, 6607 N. Forest, all of Kansas City, Mo.
Filed June 20, 1960, Ser. No. 37,280
3 Claims. (Cl. 33—46)

This invention relates to alignment devices and more particularly to devices of the type utilizing optical projection means.

It is the most important object of the present invention to provide an alignment device for determining corresponding points on spaced surfaces, relative to a predetermined reference, by utilizing an optical projection means for projecting the image of a known point on one surface onto another surface, between which surfaces alignment is desired.

Another important object of the instant invention is the provision of an alignment device adapted to be mounted on a surface and provided with an optical projection means secured to a relatively shiftable plate for shifting the optical axis of the projection means to align a point on the surface relative to a known reference with a corresponding point on a surface spaced therefrom.

Still another object of this invention is the provision of an alignment device having an optical projection means mounted on a support for aligning corresponding surface points, which projection means includes a pair of relatively shiftable tubes concentrically disposed relative to a point on one surface, one of which tubes contains a collimating lens and the other of which contains a reference index, and a battery-powered incandescent means associated with the tubes for providing a light source for projecting the image of the index and, hence, of the point through the lens and onto a surface spaced therebeyond.

Other important objects of this invention are the provision of screw means threadably mounted on the support for shifting the latter relative to a predetermined reference; the provision of a leg secured to the support and having a longitudinal axis coextensive with the optical axis of the projection means; the provision of a power source which is carried by the support to thereby eliminate power delivering extension cords; and the provision of radially disposed, inwardly directed mounting screws for mounting the shiftable tubes of the projection means with a cylindrical housing. The instant invention is especially adapted for use in aligning pipes of a plumbing system to assure the verticality of the pipes between adjacent floors of a building or the like.

Other important objects of this invention will become apparent as the following specification progresses.

In the drawings:

FIGURE 1 is a cross sectional side elevational view of the instant device, illustrating one embodiment thereof;

FIG. 2 is a plan view of the subject device; and

FIG. 3 is a cross sectional view taken along line 3—3 of FIG. 1.

In FIG. 1, one embodiment of the instant device is shown mounted on a horizontal surface and disposed for projecting the image of a set of crosshairs within a projecting telescope located on the surface onto another surface thereabove.

The alignment device which is the subject of this invention is broadly denoted by the numeral 10 and it is comprised of a flat plate 12 and an optical projection means 14 mounted on plate 12.

Plate 12 is provided with an upper face 16 and a lower face 18, and a pair of spaced openings 20 provided through plate 12 proximal to end 21 thereof. Annular rings 22 are secured to the plate and surround openings 20, and are threaded in order to receive screws 24 which pass therethrough and are shiftable therein. Screws 24 are provided with heads 26 so that screws 24 may be rotated relative to the plate by a suitable tool. Secured to arcuate end 27 opposite to end 21 of plate 12 is an annular collar 28 having a threaded aperture 30 through wall 31 thereof for receiving set screw 32 for a purpose hereinafter to be described. An elongated cylindrical leg 34 is inserted within collar 28 at one end 35 of the leg and is releasably held within collar 28 by means of set screw 32 bearing against the outer surface of end 35. An annular flange 36 is secured to the leg 34 proximal to end 35 to provide a shoulder 38 for abutment against the underside 40 of collar 28 to thereby stabilize leg 34 when end 35 of the latter is inserted within collar 28. Opposite end 42 of leg 34 is turned down so as to present a pointed tip for insertion within a small hole 43 in a surface 45 upon which device 10 is adapted to rest when in use. It is the purpose of device 10 to determine the point corresponding to hole 43 on a surface spaced above surface 45.

A pair of bubble-type leveling devices 44 and 46 are provided on the upper face 16 of plate 12 to indicate the degree of alignment of upper face 16 relative to a truly vertical direction. Leveling device 44 indicates the degree of levelness of plate 12 as the latter rotates about an axis through leg 34 parallel to the line connecting screws 24. Leveling device 46 indicates the degree of levelness of plate 12 as the latter rotates about an axis through leg 34 and one of the screws 24.

Optical projection means 14 comprises a cylindrical housing 47, a first tube 48 and a second tube 50 telescoped over first tube 48. Housing 47 is secured at one end 51 thereof to upper face 16 of plate 12 as by welding and extends upwardly therefrom, terminating at an open end 52 so that the longitudinal axis of housing 47 is substantially collinear with the longitudinal axis of leg 34. A plurality of spaced setscrews 54 are threadably mounted through the cylindrical wall of housing 47 for a purpose hereinafter to be described. Setscrews 54 are reciprocable through housing 47 and have portion 56 normally extending radially toward the center therewithin. Setscrews 54 are provided with nuts 58 on the outer portions 60 thereof for limiting the inward movement thereof. Setscrews 54 are disposed on housing 47 in three vertically spaced groups, each group being peripherally spaced around housing 47.

At end 51 of housing 47 an arcuate portion thereof is removed to provide an opening 61 therein, so that access to the interior of housing 47 may be gained.

Tubes 48 and 50 are mounted within housing 47 by virtue of inner portions 56 of set screws 54 bearing against the outer surfaces of respective tubes to hold the latter suspended by friction. The lowermost group of set screws 54 of housing 47 engage the outer surface of tube 48 proximal to end 62 thereof, and upper end 63 of tube 48 is telescoped within end 65 of tube 50. The intermediate and uppermost groups of set screws 54 engage the outer surface of tube 50 to frictionally suspend the latter, and thereby end 63 of tube 48, within housing 47. It is manifest, therefore, that, by proper adjustment of set screws 54, tubes 48 and 50 may be concentrically aligned within housing 47, so that the longitudinal axes of tubes 48 and 50 will be coincident with that of housing 47.

First tube 48 is provided with a pair of mutually perpendicular cross hairs 64 secured to an annular ring 66 mounted on the upper end 63 of first tube 48 by virtue of being wrapped around screws 70 threadably mounted in ring 66. The latter is suitably secured to end 63, as by welding. Cross hairs 64 intersect each other at a point substantially at the center of ring 66 coincident with a point on the longitudinal axis of tube 48.

Second tube 50 is provided with a collimating lens 72 rigidly mounted at the upper end 74 thereof, which lens 72 has an optical axis substantially coincident with the longitudinal axis of tube 50. A flanged cap 76 having an enlarged aperture therein is threadably mounted on the upper end 74 of second tube 50 for retaining a transparent member 78 therein to prevent dust and moisture from entering tube 50 and fogging the upper surface of lens 72. A gasket 77 of suitable material, such as rubber, surrounds open end 52 of housing 47 to seal the annular space between end 52 and tube 50.

An incandescent means (not shown) is inserted within opening 61 of housing 46 to provide a source of light for projecting the image of cross hairs 64 onto a surface spaced above surface 45. A source of power for the incandescent means is housed in box 80, the latter being mounted on housing 46 by virtue of being attached to set screws 54 as is clear in FIG. 1. Electrical wiring in conduit 82 operably connects the power source mounted in box 80 with the incandescent means mounted within housing 47. A switch 84 is provided on one side of box 80 and is operably coupled in the circuit containing the incandescent means and the power source for actuating the latter and thereby the incandescent means.

The embodiment of the instant invention illustrated in FIG. 1 shows the same utilized for aligning plumbing members such as elongated pipe between floors of a multistoried structure, as during the construction stage thereof. To use the instant device in this manner it is understood that a concrete floor 86 has previously been poured over a horizontal base 45 and around a sleeve 90 formed by a removable element (not shown). Alignment device 10 is disposed on the concrete surface, screws 24 being in engagement with the upper surface 91 of floor 86 and leg 36 being in engagement with opening 43 in base 45, it being understood that housing 47 is secured substantially normally to face 16 of plate 12 and tubes 48 and 50 are concentrically aligned relative to housing 47 by set screws 54, so that the optical axis of the optical system comprising lens 92 and cross hairs 64 is substantially collinear with the longitudinal axis of leg 34. Screws 24 are then shifted so that plate 12 may be moved until the bubbles of leveling devices 42 and 44 are centered to indicate that plate 12 is truly horizontal. In this condition the optical axis of the lens-cross hair system and the longitudinal axis of leg 34 is substantially vertical. Incandescent means within housing 46 are then actuated by operating switch 84 and the light so produced passes upwardly through lens 72 and out through the upper end 74 of second tube 50. Lens 72 causes the rays of light to be collimated so that the rays are substantially parallel when they leave end 74 of second tube 50. Since cross hairs 64 are disposed within tube 48 between the incandescent means and lens 72, the image of the cross hairs 64 is therefore projected on a surface above device 10, and this image and point 43 of base 45 define an imaginary line which is substantially vertical so that the point on the upper surface at which the image falls is marked, indicating the location at which provision should be made for receiving plumbing pipe from the surface below.

It is to be noted that device 10 is adapted to be carried from point to point without any danger of entanglement with depending wires. Another interesting feature of the instant device is that tubes 48 and 50 may be adjusted relative to each other so that device 10 may be utilized with a structure having floors spaced a standard distance so that the projected image on the upper floor will always be in focus, thereby expediting the work and performing the same more effectively.

Having thus described the invention what is claimed as new and desired to be secured by Letters Patent is:

1. A device for determining the location of a point on one surface with respect to a point on another surface spaced vertically from said one surface, said device comprising a support adapted to be disposed between the surfaces and having a plurality of legs thereon for supporting the same above said other surface, one of the legs being adapted to engage said other surface at said point thereon, at least a pair of said legs adjacent said one leg being shiftable relative to the support to render the latter shiftable relative to said other surface and thereby shift said one leg until the longitudinal axis thereof is vertically disposed; and elongated optical projection means provided with a reference index and secured to said support in outwardly extending relationship thereto, said projection means having an optical axis collinear with the longitudinal axis of said one leg and disposed to project the image of said index away from said plate and onto said one surface, whereby said image on said one surface defines the point thereon and said points are thereby in substantially vertical alignment relative to said reference when said one leg is vertically disposed.

2. A device as set forth in claim 1 wherein said support comprises a flat plate, said one leg being secured to the normally lowermost face of said plate and projecting downwardly therefrom, said pair of spaced legs being threadably mounted on said plate for movement relative thereto.

3. A device as set forth in claim 2 wherein is provided indicator means on the upper surface of the plate for indicating the levelness of the plate with respect to the reference, said projection means being secured to said plate on the upper surface thereof and projecting upwardly therefrom in overlying relationship to said one leg.

References Cited in the file of this patent

UNITED STATES PATENTS

| | | |
|---|---|---|
| 955,958 | Frese | Apr. 26, 1910 |
| 2,517,295 | Esher | Aug. 1, 1950 |

FOREIGN PATENTS

| | | |
|---|---|---|
| 218,457 | Great Britain | July 10, 1924 |